(12) United States Patent
Yadav et al.

(10) Patent No.: US 9,213,791 B1
(45) Date of Patent: Dec. 15, 2015

(54) METHOD AND APPARATUS FOR ABUTTING P-CELL LAYOUT BASED ON POSITION AND ORIENTATION

(71) Applicants: Amar K. Yadav, Delhi (IN); Zameer Iqbal, Delhi (IN); Dwarka Prasad, Noida (IN)

(72) Inventors: Amar K. Yadav, Delhi (IN); Zameer Iqbal, Delhi (IN); Dwarka Prasad, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 47 days.

(21) Appl. No.: 14/334,657

(22) Filed: Jul. 17, 2014

(51) Int. Cl.
*G06F 17/50* (2006.01)

(52) U.S. Cl.
CPC .................. *G06F 17/5072* (2013.01)

(58) Field of Classification Search
CPC .................. G06F 17/5068; G06F 17/5072
USPC .................................................. 716/119
See application file for complete search history.

(56) References Cited

U.S. PATENT DOCUMENTS

| | | | |
|---|---|---|---|
| 7,546,556 B1 | 6/2009 | Wagner | |
| 7,971,175 B2 | 6/2011 | Ginetti et al. | |
| 8,046,730 B1* | 10/2011 | Ferguson et al. | 716/139 |
| 8,392,856 B2 | 3/2013 | Misaka et al. | |
| 8,694,941 B1 | 4/2014 | Badel et al. | |
| 8,910,100 B1* | 12/2014 | Wilson et al. | 716/112 |
| 2004/0251501 A1* | 12/2004 | Catalasan et al. | 257/355 |
| 2005/0132306 A1* | 6/2005 | Smith et al. | 716/1 |
| 2008/0005712 A1* | 1/2008 | Charlebois et al. | 716/10 |
| 2010/0257497 A1* | 10/2010 | Mallon et al. | 716/5 |
| 2011/0307854 A1 | 12/2011 | Lu et al. | |
| 2012/0144361 A1 | 6/2012 | Cheng et al. | |
| 2012/0254817 A1* | 10/2012 | Sherlekar | 716/119 |
| 2013/0042216 A1 | 2/2013 | Loh et al. | |
| 2013/0074018 A1* | 3/2013 | Hsu et al. | 716/55 |
| 2014/0359546 A1* | 12/2014 | Chan et al. | 716/119 |
| 2015/0064867 A1* | 3/2015 | Jeong | 438/268 |

OTHER PUBLICATIONS

Virtuoso(c) Layout Suite XL User Guide, Product Version ICADV12.1, Chapter 5, Cadence Design Systems, Inc., Dec. 2013.

\* cited by examiner

*Primary Examiner* — Suchin Parihar
(74) *Attorney, Agent, or Firm* — Charles Bergere

(57) ABSTRACT

An electronic design automation (EDA) tool generates first and second instances, which are different in at least one aspect, of a cell representing a device, allowing a user to initiate an abutment of the first and second instances in a layout canvas, reads a position and orientation of each of the first and second instances to be abutted from the layout canvas, evaluates the respective positions and orientations of the first and second instances, altering a component of one of the first and second instances based on the evaluation, and then automatically abuts the first and second instances following the alteration of the component of the one of the first and second instances.

20 Claims, 4 Drawing Sheets

METHOD AND APPARATUS FOR ABUTTING P-CELL LAYOUT BASED ON POSITION AND ORIENTATION

BACKGROUND OF THE INVENTION

The present invention is directed to computer aided circuit design and, more particularly, to a method and system for automatically abutting p-cell layouts based on position and orientation of abutting instances.

In circuit design, a parameterized cell (p-cell) is a cell that is automatically generated by an electronic design automation (EDA) tool based on a value or values of governing parameters. That is, a p-cell represents a part or a component of a circuit that is dependent on one or more parameters, such as transistors or the like.

Analog and memory circuit designs typically require abutting p-cell instances having different dimensions. These designs cause design rule check (DRC) errors due to the limitations of the abutment functionality in current EDA tools, and there currently is no control at the p-cell code level to resolve such issues. The solution offered by current EDA tools for auto-abutment is placement of a stopping gate at 40 nm and lower technologies. In one conventional automatic abutment procedure, the EDA tool considers the overlap of pins in the first and second instances, and automatically adjusts the pin arrangement in the abutted configuration to remove redundant pins. However, this tool does not take into account the position and orientations of the respective instances, and therefore does not alter other necessary parameters to avoid the types of DRC errors described above.

It is therefore desirable to provide a method for an EDA tool to make alterations to components of abutting p-cells that avoid the types of DRC errors caused by the automatic abutment of two differing p-cells.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale. Notably, certain vertical dimensions have been exaggerated relative to certain horizontal dimensions.

In the drawings.

DETAILED DESCRIPTION

In one embodiment, the present invention provides a method of computer-aided design of an integrated circuit that includes generating, using an EDA tool, a first instance and a second instance of a cell representing a device, where the first and second instances are different in at least one aspect. The method further includes allowing a user, using the EDA tool, to initiate an abutment of the first and second instances in a layout canvas, reading a position and orientation of each of the first and second instances to be abutted from the layout canvas, evaluating the respective positions and orientations of the first and second instances, altering at least one component of at least one of the first and second instances based on the evaluation, and automatically abutting the first and second instances following the alteration of the at least one component of the at least one of the first and second instances.

In another embodiment, the present invention comprises an EDA tool for computer-aided design of an integrated circuit (IC) and includes a memory, a display, an input, and a processor coupled to the memory, the display, and the input. The processor is configured to generate a first instance and a second instance of a cell representing a device, the first and second instances being different in at least one aspect, allow a user, via the input, to initiate an abutment of the first and second instances in a layout canvas shown on the display, read a position and orientation of each of the first and second instances to be abutted from the layout canvas, evaluate the respective positions and orientations of the first and second instances, alter at least one component of at least one of the first and second instances based on the evaluation, and automatically abut the first and second instances following the alteration of the at least one component of the at least one of the first and second instances.

In another embodiment, the present invention comprises a non-transitory computer readable storage medium comprising computer readable instructions for designing an integrated circuit by executing, by an EDA tool, the steps of generating a first instance and a second instance of a parameterized cell representing a device, the first and second instances being different in at least one aspect, allowing a user to initiate an abutment of the first and second instances in a layout canvas, reading a position and orientation of each of the first and second instances to be abutted from the layout canvas, evaluating the respective positions and orientations of the first and second instances, altering at least one component of at least one of the first and second instances based on the evaluation, and automatically abutting the first and second instances following the alteration of the at least one component of the at least one of the first and second instances.

Figure 1:
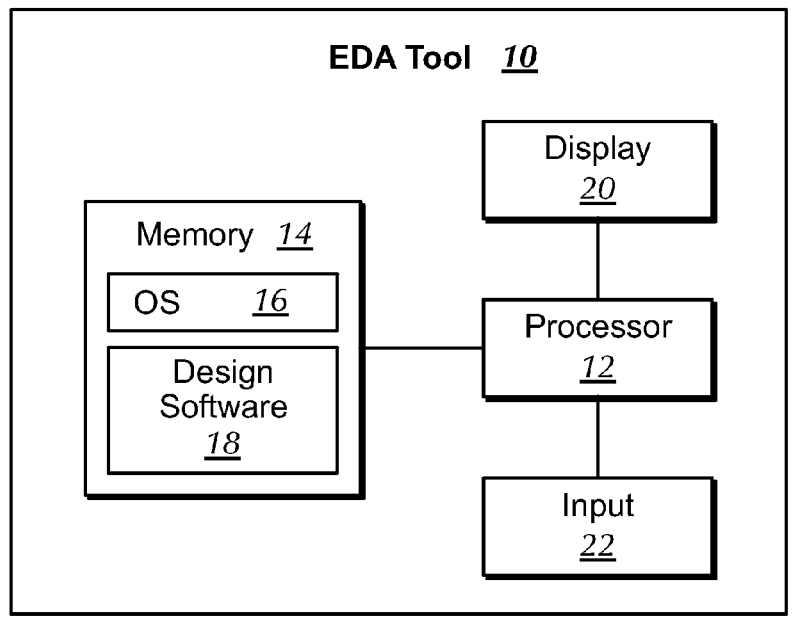
FIG. 1 is a schematic block diagram of relevant portions of an EDA tool for use in accordance with a preferred embodiment of the present invention.

Referring now to the drawings, wherein the same reference numerals are used to designate the same components throughout the several figures, there are shown in FIG. 1 relevant components of an electronic design automation (EDA) tool 10 for use in designing an integrated circuit (IC) in accordance with a first embodiment of the present invention. The EDA tool 10 is configured to execute the necessary software operations for circuit design. The EDA tool 10 can be, for example, one or more dedicated workstations, a desktop computer, laptop computer, tablet computer, or the like.

The EDA tool 10 includes one or more processors 12 (which may be collectively referred to as a processor). The processor 12 may be a central microprocessor, microcontroller, or the like. The processor 12 is coupled to a memory 14, which may be in the form of a volatile memory (e.g., random access memory (RAM) or the like) or non-volatile memory (e.g., flash, read-only memory (ROM), or the like), or combinations thereof. In one embodiment, the memory 14 may be a mass storage non-volatile memory and the processor 12 may include an internal RAM (not shown). The memory 14 preferably stores an operating system 16, as well as application programs, such as various forms of design software 18 that can be executed by the processor 12.

The EDA tool 10 further includes a display 20 and an input 22. The display 20 may be a screen, monitor, or the like using liquid crystal display (LCD), light emitting diode (LED), cathode ray tube (CRT), digital light processing (DLP) technology or the like. The input 22 may be one or more of a touchscreen, mouse, keyboard, or the like.

Figure 3A:
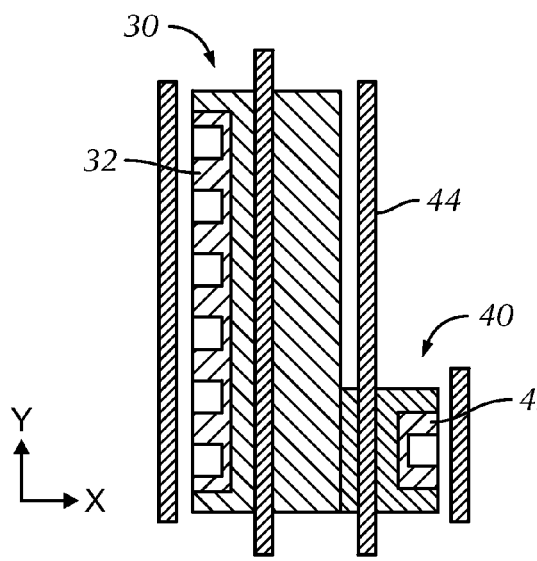
FIG. 3A is a first exemplary display of a layout canvas having first and second abutting instances resulting from the method of FIG. 2.
Figure 2:
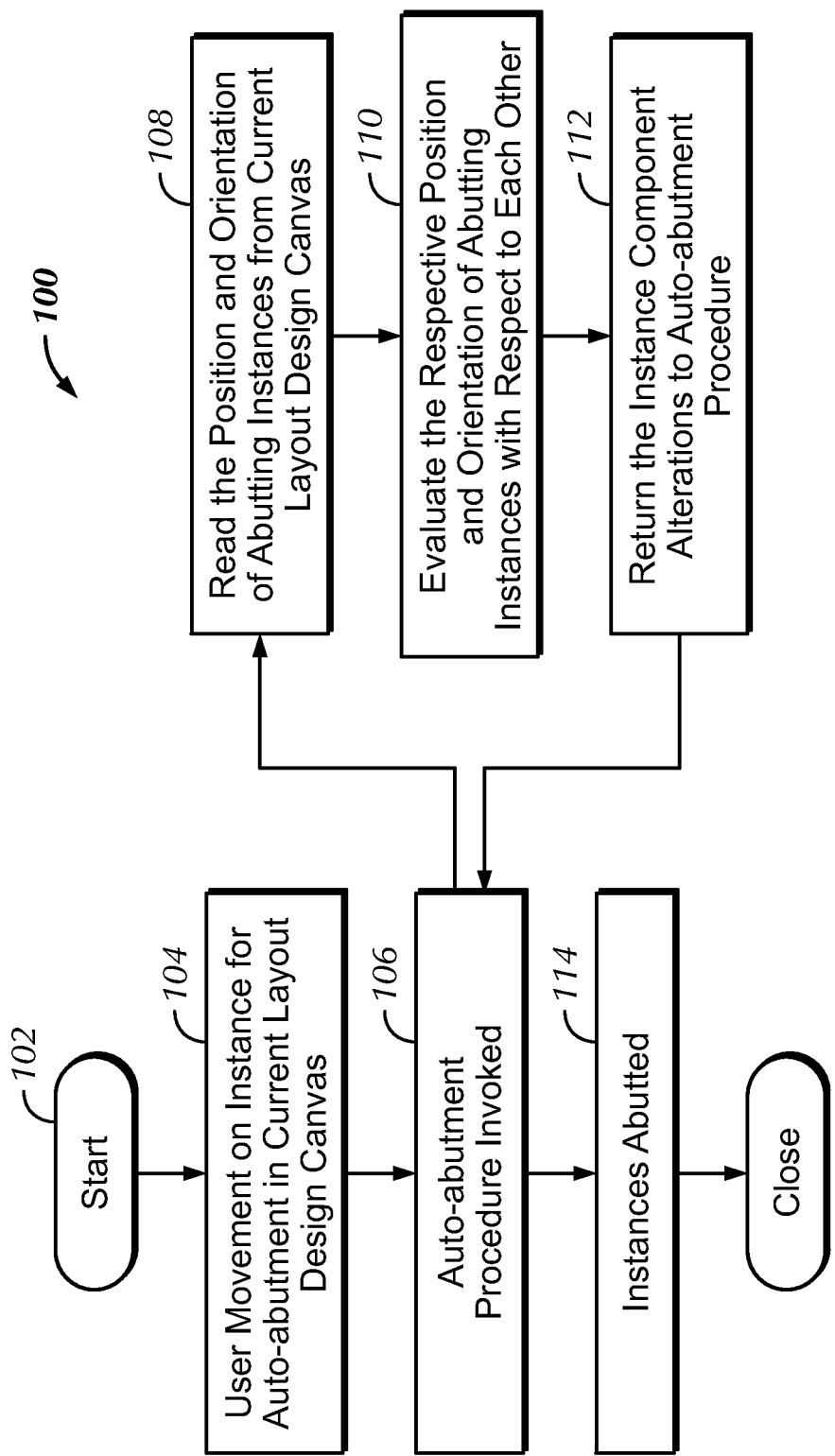
FIG. 2 is a flow chart illustrating a method for designing a circuit in accordance with a preferred embodiment of the present invention.

FIG. 2 is a flow chart illustrating a method or program 100 for designing an integrated circuit, which may be executed by the EDA tool 10 in FIG. 1. Referring to FIGS. 2 and 3A, at the start 102 of the program 100, the EDA tool 10 will have generated, typically at the behest of a user, a first instance 30 and a second instance 40 of a cell representing a device. The cell is preferably a parameterized cell (p-cell), although other forms may be used as well. The first and second instances 30, 40 may be shown on the display 20 to the user in the layout canvas in different locations. It should be noted that more than two instances 30, 40 may be generated and displayed to the user, depending on the requirements of the circuit being designed. The first and second instances 30, 40 preferably also are different in at least one aspect, such as length, width, number of pins, orientation in the layout canvas, or the like.

In the example of FIG. 3A, the first and second instances 30, 40 each represent a field effect transistor (FET) with a single gate finger 32, 42. However, the second instance 40 is much shorter in the Y-direction than the first instance 30. In a conventional EDA tool, abutment of the first and second instances 30, 40 would result in a gate polysilicon end cap 44 of the second instance 40 that is much shorter in the Y-direction than the first instance 30. This would result in a DRC error, which can be avoided using embodiments of the present invention, as set forth more fully below.

It should be noted that more than two instances 30, 40 may be generated and displayed to the user, depending on the requirements of the circuit being designed. Such additional instances (not shown) may be identical to or different from one or more of the first and second instances 30, 40.

At step 104, the user is permitted, via the input 22, to initiate an abutment of the first and second instances 30, 40 of the cell. The initiation may be made by dragging one of the instances 30, 40 on the display 20 to a position adjacent the other of the instances 30, 40, typing or selecting a command using the input 22, or the like. This action triggers the automatic abutment procedure 106 of the program. However, rather than proceeding to immediately abut the first and second instances 30, 40 in the conventional fashion, additional processing is performed.

Specifically, at step 108, the EDA tool 10 reads the position and orientation of each of the first and second instances 30, 40 to be abutted from the layout canvas. For example, the EDA tool 10 may read dimensions of components of the first and second instances 30, 40 in the X- and Y-directions, rotation of the first and second instances 30, 40, and the like.

With this position, dimension, and orientation information, the EDA tool 10 at step 110 evaluates the respective positions and orientations of the first and second instances 30, 40 to determine whether any alterations are necessary to maintain the integrity of the circuit. Such alterations may be determined based on known circuit design dimensions applicable to adjacent components, on known potential DRC errors, or the like. At step 112, any necessary component alterations are returned to the automatic abutment program, which at step 114 performs the necessary alterations and automatically abuts the altered first and second instances 30, 40. It should be noted that if no alterations are necessary, the first and second instances 30, 40 may be abutted in the conventional manner.

In the example of FIG. 3A, the EDA tool 10 will determine, based on the positions and orientations of the first and second instances 30, 40, that the gate polysilicon end cap 44 must be extended in the positive Y-direction in order to properly abut the first and second instances 30, 40. The elongated gate polysilicon end cap 44 is then located with respect to the first instance 30 at a location based on a position of the remainder of the second instance 40. Thus, what is shown in FIG. 3A is the result of the method of FIG. 2 altering the length in the Y-direction of the gate polysilicon end cap 44 for the second instance 40 to abut the first instance 30 at a lower portion thereof.

Figure 3B:
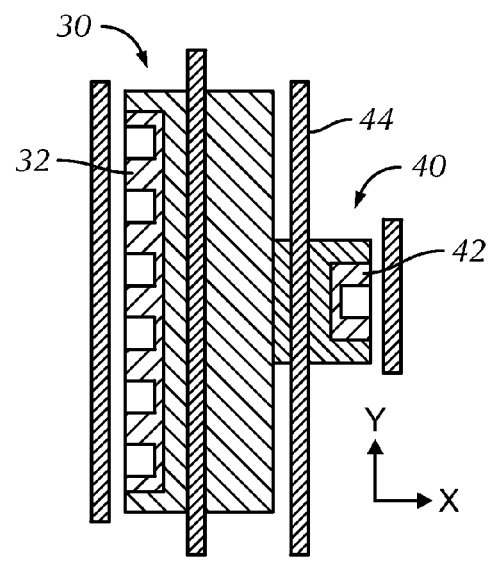
FIG. 3B is a second exemplary display of a layout canvas having first and second abutting instances resulting from the method of FIG. 2.
Figure 3C:
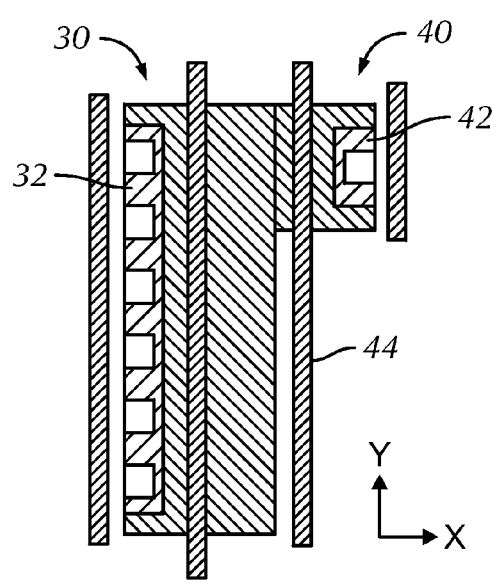
FIG. 3C is a third exemplary display of a layout canvas having first and second abutting instances resulting from the method of FIG. 2.

FIG. 3B shows a similar result where the second instance 40 is moved to abut the first instance 30 at a middle portion thereof. In that case, the EDA tool 10 may determine and execute an alteration of the gate polysilicon end cap 44 to extend in the positive and negative Y-direction. FIG. 3C shows another similar result where the second instance 40 is moved to abut the first instance 30 at a top portion thereof, requiring extension of the gate polysilicon end cap 44 in the negative Y-direction.

While not shown, similar results would apply if the first and second instances 30, 40 were both rotated by about 90° such that the gate polysilicon end cap 44 extended in the X-direction. Alterations in the X-direction would be performed as a result of the evaluation of the respective positions and orientations of the first and second instances 30, 40.

Figure 4:
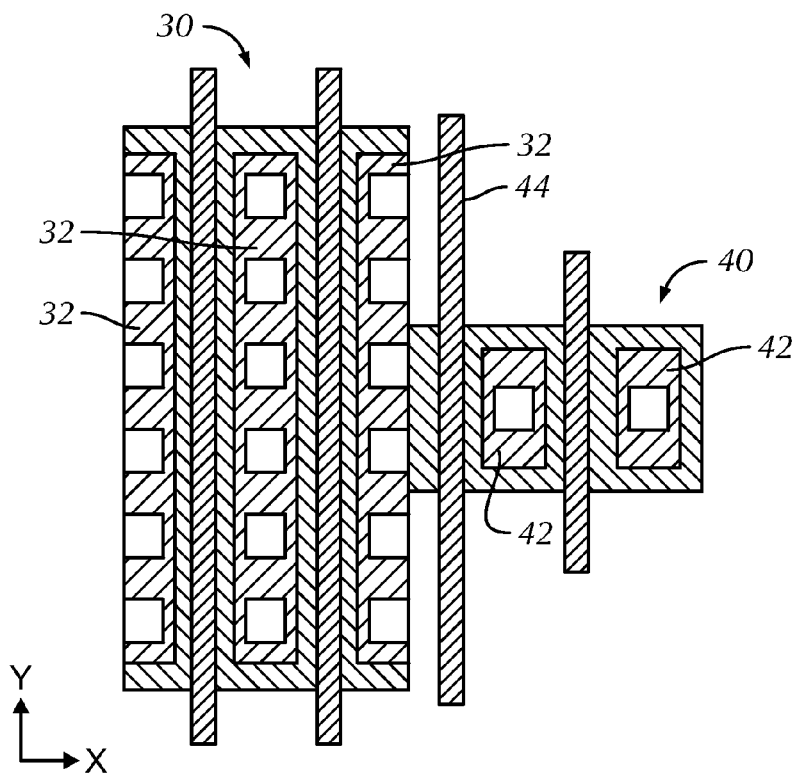
FIG. 4 is a fourth exemplary display of a layout canvas having first and second abutting instances resulting from the method of FIG. 2.

FIG. 4 is a slight variation on the configuration shown in FIG. 3B in that the first and second instances 30, 40 represent FETs each having multiple gate fingers 32, 42. However, the result is similar to that of FIG. 3B in that the second instance 40 abuts the first instance 30 at a middle portion thereof, and the gate polysilicon end cap 44 is altered to extend in the positive and negative Y-directions to compensate for the abutment of the dissimilar first and second instances 30, 40.

Figure 5:
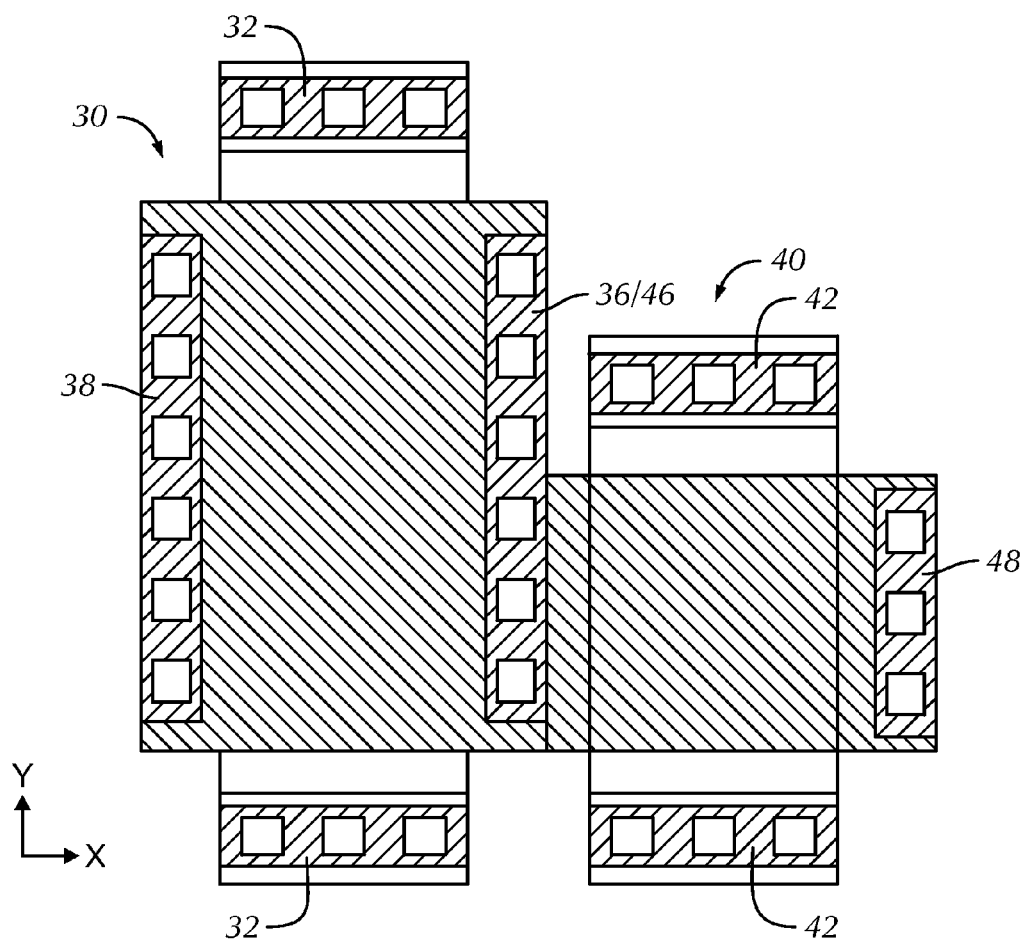
FIG. 5 is a fifth exemplary display of a layout canvas having first and second abutting instances resulting from the method of FIG. 2.

FIG. 5 shows a different exemplary arrangement of first and second instances 30, 40 that are automatically abutted. Like the arrangements in FIGS. 3A-3C and 4, the second instance 40 differs from the first instance 30 by length in the Y-direction. Each of the first and second instances 30, 40 represents a FET having single gate fingers 32, 42 arranged on top and bottom sides thereof. A drain metal strip 36/46 is positioned between the first and second instances 30, 40, while source metal strips 38, 48 are arranged on sides of the first and second instances 30, 40 opposite to the drain metal strip 36/46.

In traditional automatic abutment, the material of the gate finger 42 atop the second instance 40 would be extended to contact the drain metal strip 36/46, resulting in a deficient circuit and a DRC error. Using the method described herein, the EDA tool 10 uses the position and orientation of the first and second instances 30, 40 to determine that the gate finger 42 atop the second instance 40 should be reduced in the X-direction to avoid contact with the drain metal strip 36/46.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and with the exception of expressly ordered steps, the order of operations may be altered in various other embodiments.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

In the claims, the word 'comprising' or 'having' does not exclude the presence of other elements or steps then those listed in a claim. Further, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A method of computer-aided design of an integrated circuit, the method comprising:
   generating, using an Electronic Design Automation (EDA) tool, a first instance and a second instance of a cell representing a device, the first and second instances being different in at least one aspect;
   allowing a user, using the EDA tool, to initiate an abutment of the first and second instances in a layout canvas;
   reading, by the EDA tool, a position and orientation of each of the first and second instances to be abutted from the layout canvas;
   evaluating, by the EDA tool, the respective positions and orientations of the first and second instances;
   altering, by the EDA tool, at least one component of at least one of the first and second instances based on the evaluation; and
   automatically abutting, by the EDA tool, the first and second instances following the alteration of the at least one component of the at least one of the first and second instances.

2. The method of claim 1, wherein the first instance extends to a first length in a first direction and the second instance extends to a second length in the first direction, the first length being greater than the second length.

3. The method of claim 2, wherein the at least one component is a gate polysilicon end cap of the second instance that is located between the first and second instances, the altering by the EDA tool including elongating the gate polysilicon end cap in the first direction.

4. The method of claim 3, wherein in the automatic abutment, the elongated gate polysilicon end cap is located with respect to the first instance based on a position of a remainder of the second instance with respect to the first instance.

5. The method of claim 2, wherein the first instance extends to a first width in a second direction and the second instance extends to a second width in the second direction, the second direction being perpendicular to the first direction.

6. The method of claim 5, wherein the at least one component is a gate finger of the second instance extending in the second direction.

7. The method of claim 1, wherein the cell is a parameterized cell.

8. An electronic design automation (EDA) tool for computer-aided design of an integrated circuit (IC), the system comprising:
   a memory;
   a display;
   an input; and
   a processor coupled to the memory, the display, and the input, and configured to:
      generate a first instance and a second instance of a cell representing a device, the first and second instances being different in at least one aspect,
      allow a user, via the input, to initiate an abutment of the first and second instances in a layout canvas shown on the display,
      read a position and orientation of each of the first and second instances to be abutted from the layout canvas,
      evaluate the respective positions and orientations of the first and second instances,
      alter at least one component of at least one of the first and second instances based on the evaluation, and
      automatically abut the first and second instances following the alteration of the at least one component of the at least one of the first and second instances.

9. The EDA tool of claim 8, wherein the first instance extends to a first length in a first direction and the second instance extends to a second length in the first direction, the first length being greater than the second length.

10. The EDA tool of claim 9, wherein the at least one component is a gate polysilicon end cap of the second instance that is located between the first and second instances, the altering including elongating the gate polysilicon end cap in the first direction.

11. The EDA tool of claim 10, wherein in the automatic abutment, the elongated gate polysilicon end cap is located with respect to the first instance based on a position of a remainder of the second instance with respect to the first instance.

12. The EDA tool of claim 9, wherein the first instance extends to a first width in a second direction and the second instance extends to a second width in the second direction, the second direction being perpendicular to the first direction.

13. The EDA tool of claim 12, wherein the at least one component is a gate finger of the second instance extending in the second direction.

14. The EDA tool of claim 8, wherein the cell is a parameterized cell.

15. A non-transitory computer readable storage medium comprising computer readable instructions executable by an electronic design automation (EDA) tool for designing an integrated circuit (IC) by executing the steps of:

generating a first instance and a second instance of a parameterized cell representing a device, the first and second instances being different in at least one aspect;

allowing a user to initiate an abutment of the first and second instances in a layout canvas;

reading a position and orientation of each of the first and second instances to be abutted from the layout canvas;

evaluating the respective positions and orientations of the first and second instances;

altering at least one component of at least one of the first and second instances based on the evaluation; and automatically abutting the first and second instances following the alteration of the at least one component of the at least one of the first and second instances.

16. The non-transitory computer readable storage medium of claim 15, wherein the first instance extends to a first length in a first direction and the second instance extends to a second length in the first direction, the first length being greater than the second length.

17. The non-transitory computer readable storage medium of claim 16, wherein the at least one component is a gate polysilicon end cap of the second instance that is located between the first and second instances, the altering including elongating the gate polysilicon end cap in the first direction.

18. The non-transitory computer readable storage medium of claim 17, wherein in the automatic abutment, the elongated gate polysilicon end cap is located with respect to the first instance based on a position of a remainder of the second instance with respect to the first instance.

19. The non-transitory computer readable storage medium of claim 16, wherein the first instance extends to a first width in a second direction and the second instance extends to a second width in the second direction, the second direction being perpendicular to the first direction.

20. The non-transitory computer readable storage medium of claim 19, wherein the at least one component is a gate finger of the second instance extending in the second direction.

* * * * *